(12) United States Patent
Sadkin et al.

(10) Patent No.: US 6,474,315 B1
(45) Date of Patent: Nov. 5, 2002

(54) ELECTRON STIMULATION VIA PHOTON EMITTING RADIATION

(75) Inventors: Martin J. Sadkin, West Amherst, NY (US); Frank G. Chown, Toronto (CA); Bruce G. Baker, Phoenix, AZ (US); Kent C. Sweek, Kirtland, NM (US); Edmun J. Hatcher, Farmington, MN (US)

(73) Assignee: International Combustion Enhancement Corp., Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/043,362

(22) PCT Filed: Sep. 13, 1996

(86) PCT No.: PCT/US96/14780

§ 371 (c)(1),
(2), (4) Date: Dec. 16, 1999

(87) PCT Pub. No.: WO97/10428

PCT Pub. Date: Mar. 20, 1997

(Under 37 CFR 1.47)

(51) Int. Cl.⁷ .............................................. F02M 31/18
(52) U.S. Cl. .................................................... 123/538

(58) Field of Search ................................. 123/536, 537, 123/538, 339.15

(56) References Cited

U.S. PATENT DOCUMENTS

| | | | |
|---|---|---|---|
| 4,043,308 A | | 8/1977 | Cerkanowicz |
| 4,195,606 A | | 4/1980 | Wallis, Jr. et al. |
| 4,556,020 A | | 12/1985 | Hickling |
| 4,672,938 A | | 6/1987 | Hoppie et al. |
| 4,726,336 A | | 2/1988 | Hoppie et al. |
| 5,328,665 A | | 7/1994 | Geiger |
| 5,829,419 A | * | 11/1998 | Sadkin et al. ................ 123/538 |

* cited by examiner

Primary Examiner—Marguerite McMahon
(74) Attorney, Agent, or Firm—Kirkpatrick & Lockhart LLP

(57) ABSTRACT

The device of the present invention includes a radiation generator capable of emitting photons to a target area, a power supply and a fuel transporter fluidly connected to the target area. Fuel is introduced into the target area via the fuel transporter to inlet nipple. In the target area, preferably a reservoir, the fuel passes over the radiation generator, which may be a non-pressurized ultraviolet element. Alternate embodiments of the radiation generator may include a laser. The invention also includes a process for ionizing a target, such as fuel for combustion, by irradiating the fuel with photons at an effective distance and an effective wavelength not less than about 1×1011 Hz.

10 Claims, 8 Drawing Sheets

ELECTRON STIMULATION VIA PHOTON EMITTING RADIATION

BACKGROUND OF INVENTION

1. Field of Invention

This invention relates to a method and device for the transmission and emission of high energy photons for the purpose of dissociation of target molecules, such as hydrocarbon-based fuels. In particular, it relates to a device which may be positioned in an internal combustion engine's fuel line and/or air intakes immediately prior to the target molecule's introduction into the carburetor or fuel injection system; and an associated process which results in far more complete combustion, which in turn results in more engine output per unit measure of fuel and decreased quantities of airborne toxic emissions.

2. Description of Invention Background

Combustion engines are well known devices. The combustion process which takes place in these engines contains many inefficiencies. Not only do combustion engines fail to allow complete combustion of the fuel, they also produce many end products which are harmful, if not toxic, to the environment.

Although many improvements to the combustion systems utilized over the past ten years have increased the efficiency of, and decreased toxic emissions from, combustion sources, there is room for further improvement. The main improvements to internal combustion engines have to do with the fuel-air mixture and turbulence caused in the passage of the mixture from the venturi to the combustion chamber. Another improvement has resulted from new injection systems and fuel-air dispersion patterns in the combustion chamber. Yet another improvement is the use of multistage ignition and lean mixes of fuel to air ratios. Each of these improvements has helped reduce emissions and, in some cases, also increased engine output. Unfortunately, each of these improvements has only marginally improved the emission situation; they have had no significant impact on reducing hazardous outputs.

U.S. Pat. No. 4,195,606 issued to Tom Wallis, Jr. (the "Wallis patent") discloses a device which affects the oxygen in ambient air being introduced into an internal combustion engine. This device, however, is not effective when utilized with relatively new engines. The Wallis device was found to produce, on average, 6% fuel savings and 40%–60% reductions of toxic airborne emissions, when utilized with pre-1986 model year engines. Later model engines, post-1986 model years, produced no significant fuel economy savings. When utilized on large engines (+200 bhp), the fairly fragile units sometimes fail when subjected to engine backfire, which destroys the unit. This problem, coupled with the relatively high price of the device, resulted in a need to develop alternative technologies.

Modern engines process air differently today than they did fifteen years ago, about the time that the Wallis device was developed. Today, air must undergo dramatic changes in both temperature and pressure. These changes result from the turbochargers and intercoolers commercially in use in today's combustion systems. The products formed in this process to affect air are highly unstable. Under adverse conditions, such as severe temperature and pressure changes, much of the affected air reverts to its original ambient form, therefore providing only minimal effect upon the combustion reaction. Thus, the Wallis device is ineffective in modern engines due to the nature of the reactants (ambient air). Air, being mostly nitrogen, hydrogen and oxygen when ionized, breaks down into atoms of each molecule. These atoms and/or ions will recombine into their molecular forms, $O_2$, $H_2$ and $N_2$, or form various other molecular compounds, such as water, ammonia and other non-combustion assisting molecules, if placed under the stress of increased pressure and temperature.

The main reasons that Wallis-based products prove to be less effective are threefold: (1) the relatively low density of air, when compared to liquids; (2) the relative speed of the air moving through the Wallis device, and (3) the amount of air being modified by the Wallis device is a very small percentage also due to the amount of air passing within the effective distance of the radiating device. The ultraviolet light source disclosed in the Wallis patent has been found to have an effective transmission distance of less than one centimeter. Any air which passes through Wallis device without traveling closer than one centimeter will remain unaffected; meaning none of the oxygen contained within that volume of air could or would be changed to an activated form of oxygen. The first reason for ineffectiveness is due to the number of molecules which could be affected per unit measure. When this is coupled with the problem of the velocity of the air, the number of affected molecules per cubic centimeter per second is smaller (by a factor of no less than $10^4$) than it would be if the same molecules were in liquid form and traveling through the device at one atmosphere of pressure. The latter is the most constraining of the problems posed for the Wallis device's effectiveness.

The Wallis device works on non-combustible molecules, eliminating the concern and risk of an explosion due to any heat generated during the Wallis process. However, it does not address or teach how to create a more efficient process without inducing an explosion or fire.

Another technology known in the industry as Combustion Efficiency Management Catalyst ("CEM-Cat") is a passive catalyst which fits on the fuel line prior to the fuel's introduction into the fuel injectors or carburetor. The CEM-Cat is said to improve fuel economy by 10–12% and decrease emissions [carbon monoxide (CO), oxides of nitrogen ($NO_x$) and total hydrocarbons (THC's)] by 20–40% for each category. The weaknesses of the CEM-Cat, however, are associated with the types of fuels which may be affected, the finite lifespan of the catalyst, the variances of effectiveness among different fuels in various applications and the susceptibility to bacterial contamination. It works only upon liquid fuels, and the effects vary widely with the fuel and the engine applications and configurations. The lifespan of the CEM-Cat is finite, once exposed to the fuel. An additional drawback is that the CEM-Cat in diesel applications may not be removed from the fuel, without developing bacteria, which causes the catalyst to no longer function as a catalyst.

CEM-Cat has a limited ability to modify fuel in such a way as to improve the combustibility of the fuel without any active parts or components. Although the CEM-Cat's effect is endothermic, the resulting reaction does not produce sufficient quantities of beneficial products to consistently affect engine and emission performance. Due to the nature of the catalyst, this product would require significantly greater mass and weight to achieve a consistent result. The necessary mass and weight would be prohibitive to current engine applications.

One solution to the incomplete combustion problems experienced in combustion systems is to induce an endothermic reaction by adding energy to the reactants, without inducing an exothermic reaction. However, problems with this process include: how to add energy to the volatile reactants without causing a fire or explosion, where to place the unit to maximize the effectiveness of the modified reactants and how to construct the units at an acceptable cost.

Of major concern is how to affect the volatile reactants without causing an exothermic chain reaction (an explosion). An exothermic reaction could result from adding energy to the fuel (rising fuel temperatures) or from the heat due to the method of operation of possible electromagnetic generators. Any increase in temperature within the fuel results in increased energy; however, increased fuel temperatures often decrease the combustibility of the fuel. Diesel, for example, will actually combust with less efficiency if the fuel is heated above a specific temperature. This is another reason that intercoolers are utilized with turbochargers; the intercoolers actually reduce the heat generated due to the increased pressure in the air. If the air remained heated, this, in turn, would cause an increase in the fuel/air mixture in the carburetor venturi, decreasing the efficiency.

There is a need for a device and method for providing a more efficient combustion of hydrocarbon-based fuels and related reactants. There is a further need for a process which produces the complete eradication of organic lifeforms present in the fuels, oxidants or diluents.

There is yet another need for a device which produces a more complete combustion process.

SUMMARY OF THE INVENTION

The device and process of the present invention solve the shortcomings of both internal and non-internal combustion engines. The present invention, which provides electron stimulation via photon emitting radiation, was developed as a result of a number of shortcomings in previous available technologies.

The device of the present invention includes a radiation generator capable of emitting energy, preferably in the form of photons, at a wavelength in the range of not less than $1 \times 10^{11}$ Hz into a target area. The device of the present invention also includes a power supply for the operation of the generator connected to the generator and a fuel transporter fluidly connected to the target area. Photons are introduced, via the use of an electromagnetic radiation generator, into a target within the target area, such as a hydrocarbon-based fuel, which provides kinetic energy to the molecules and atoms found within the fuel. By adding energy to the fuel, the molecules affected become ionized. By ionizing the fuel, the hydrocarbons and other molecules found within the fuel will begin to decompose into various hydrocarbon radicals, simple alkenes, alkanes and other simple hydrocarbon molecules. Additional products of this process are radicals of oxygen, hydrogen and hydroxides.

The device of the present invention, sometimes referred to herein as an ionization combustion energizer, creates and transmits energy sufficient to cause the desired effect and insures against sparks and excess heat. Additionally, the device provides the effective transmission distance to allow the ionization combustion energizing process of the present invention to proceed. The power supply of the present invention may be an electrical circuit to provide the necessary voltage to the electromagnetic generator under conditions requiring approximately 350 volts from a 12-volt battery. Any power supply capable of supplying the required voltage will suffice.

The present device provides more than triple the efficiency of the previous air device of the Wallis patent. The ionization combustion energizer of the present invention, through various testing, has provided 25% fuel savings and reduced emissions of CO, $NO_x$ and THC's to below 100 ppm (parts per million) on any engine loads. Further, the device provides almost 100% cleanup of carbon deposits upon any sites which would come in contact with the affected fuel. The significance of this effect is that carbon retains heat and is a primary cause of increased engine operating temperatures which lead to motor oil breakdown and engine wear. The motor oil tested proved to be efficient after 10,000 miles without any evidence of thermal breakdown. The necessity for most engine maintenance is due to oil failure and carbon buildup.

The present device can also be produced for less than 50% of the cost of the previous Wallis based device. Thus, the present invention has the benefits of increased engine life, due to less wear; versatility of use, due to its size; increased fuel economy and decreased emissions, at a relatively inexpensive unit cost to construct.

The invention further addresses the existing combustion problems by providing a device and process which allows any combustion reaction using hydrocarbon-based fuels to proceed and react at a faster rate than untreated hydrocarbon-based fuels. This same method and apparatus will also be utilized to modify aqueous and nonaqueous solutions, including water and air, which may be utilized as an oxidant or fuel in the combustion process.

By providing a means to combust the hydrocarbons efficiently, more of the carbon monoxide formed throughout the combustion process will be oxidized during combustion, as well. Hydrocarbons inhibit the combustion (oxidation) of CO. This means that if there are sufficient oxidizing agents to react with the CO, it will not react with the CO until all of the immediate hydrocarbons have been removed (combusted) from the area of reaction. Therefore, some CO will be emitted if any hydrocarbons are not combusted. By providing a more efficient means of combusting the hydrocarbons, we allow the remaining oxygen and other oxidizing radicals to react with the carbon monoxide to form carbon dioxide. Further, in another possible embodiment, if water were introduced to the fuel-air mix, modified or unmodified by ionization combustion energizer, the combustion of carbon monoxide would be more efficient, since water is a catalyst in the combustion of CO. The simpler hydrocarbons which are introduced into the combustion chamber are also much easier to combust, which means it takes less energy and time to complete the combustion reaction. This also provides for a more complete combustion.

One other effect of the ionization combustion energizer's improved combustion is that more energy is available per unit measure of fuel; more horsepower, or more work per unit. In automobiles this would translate to more mileage per gallon, and/or more horsepower.

The improved fuel-air mixture is also combusting at a lower temperature, which allows the engine to operate at a lower temperature. By lowering the operating temperature of the engine, we also decrease the likelihood of $NO_x$ production. Oxides of nitrogen ($NO_x$) are formed due to high engine temperatures. Nitrogen is neither a fuel nor oxidizing factor in hydrocarbon combustion. It is just a passive observer, referred to as a diluent. Other diluents include excess oxygen, and other non-reactive components of air such as argon. However, at excess operating temperatures, nitrogen will react with any excess oxygen present in the combustion chamber to form oxides of nitrogen. This invention provides two mechanisms to minimize this occurrence. First, by providing combustible components (fuel) at lower ignition temperatures, we decrease the chance of $NO_x$ production resulting from the direct heat of combustion. Second, by virtue of the decarbonization process, explained below, engine operating temperatures are reduced.

A de-carbonization process is effected by the improved reactants. The improved reactants contain many ions and radicals which are extremely potent oxidizing factors. These oxidizing agents travel and are part of the improved fuel. However as they travel, they react with any reactive substances they may contact. The significant product available to these oxidizing agents is carbon. Carbon is built up throughout the fuel-engine system. The most significant buildup of carbon is in the combustion chamber and all adjacent surfaces. Carbon buildup is significant not only due to its presence during combustion, thus adding carbon to react with the available oxygen, creating more CO without contributing any energy to the combustion process, but also in its characteristic of retaining heat. This heat retention factor is the significant event when determining the cause of high engine temperatures. By eliminating the carbon, we not only cut down the amount of CO but also reduce the likelihood of $NO_x$ production. Additionally, the removal of carbon deposits also allows the engine oil to remain cool and clean of carbon particulates, which dramatically prolongs the life of the engine oil.

Once the ionization combustion energizer process has eliminated the buildup of carbon and other impurities in the system, more of the oxidizing molecules and ions (radicals) are available for combustion. This also contributes to the efficiency of the engine utilizing affected reactants. The present invention provides a major improvement to the combustion process as it relates to engine efficiency and reduction in toxic airborne emissions as well as prolonging engine life.

Although the present invention is discussed herein with respect to internal combustion engines and hydrocarbon-based fuels and reactants, the device and process of the present invention are equally applicable to non-internal combustion engines and other aqueous and nonaqueous liquids and gases.

BRIEF DESCRIPTION OF THE DRAWINGS

The present invention will be better understood by reference to the drawings in which.

DETAILED DESCRIPTION OF THE PREFERRED EMBODIMENTS

For the purpose of the preferred embodiment, the detailed description will focus on the application of the present invention to an internal combustion engine operating on hydrocarbon fuel.

Figure 1:
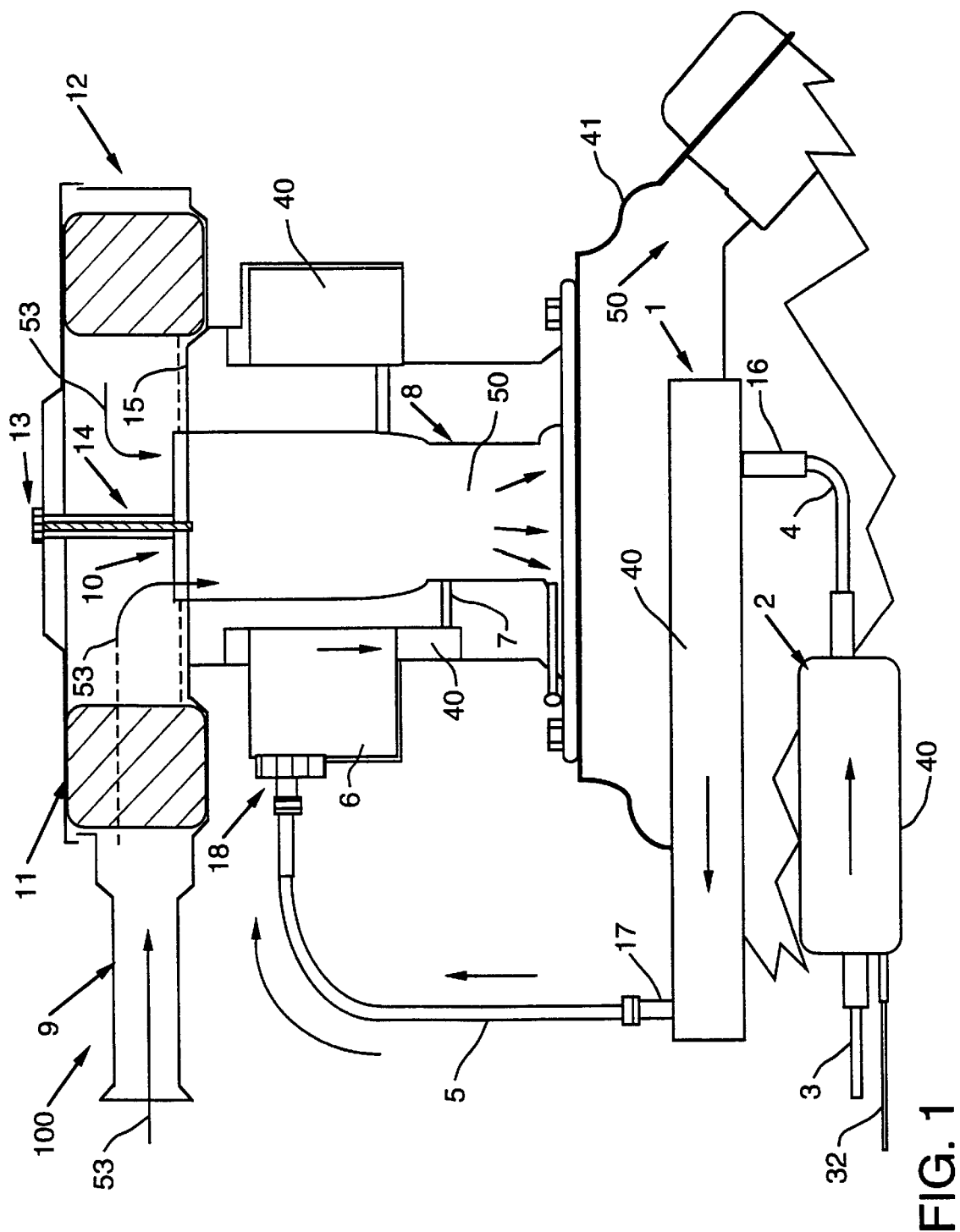
FIG. 1 is a static section view of a combustion engine having an ionization combustion energizer and undergoing the combustion process.

FIG. 1 sets forth a static section view of combustion engine 100. In a typical combustion engine, fuel 40 flows from the fuel tank 31 (shown in FIG. 3) through the main fuel line 3 into the fuel filter 2 and is pressurized by the fuel pump 30 (shown in FIG. 3). The fuel passes through the fuel filter, which removes any large particulates or contaminants present in the fuel. Unlike other combustion engines, in the improved combustion engine of the present invention, the fuel continues its passage in the combustion engine through the ionization combustion energizer 1 via fuel line 4. The fuel encounters the ionization energizer process at a target area where it is acted upon. The fuel contacts the target area by the fuel transporter which is fluidly connected to the target area. The fuel transporter may be comprised of the inlet nipple 16 and outlet nipple 17, or in alternate embodiments, it may be the fuel line 4. The target area in the preferred embodiment is reservoir (shown in FIG. 2) within the ionization combustion energizer. In alternate embodiments, the target area may be the carburetor venturi 8 or a volume of the fuel line 4.

In the preferred embodiment (shown in FIG. 2), the fuel enters the ionization combustion energizer 1 via inlet nipple 16. The fuel travels the internal length of the ionization combustion energizer 1 from inlet nipple 16 through the reservoir 25 to outlet nipple 17. The distance traveled will vary depending upon the particular engine application. The fuel undergoes the ionization/dissociation process of the present invention (the "ionization combustion energizing process") in the reservoir 25, as it passes through the ionization combustion energizer 1. As the fuel passes from the inlet nipple 16 to the outlet nipple 17, the fuel is affected by the ionization combustion energizer process if it is traveling within the effective distance of the transmitter.

In this preferred embodiment, the target is hydrocarbon fuel. However, in alternative embodiments of the invention, the target may be aqueous or non-aqueous, liquid or gas.

As the fuel passes out of the ionization combustion energizer 1 via the outlet nipple 17, the fuel enters the second fuel line 5. At this point, the fuel has now undergone many changes due to the effects of the ionization combustion energizer 1. These changes will be discussed below. The fuel now passes into the carburetor fuel bowl 6 via second inlet nipple 18. In the carburetor fuel bowl 6 the fuel awaits introduction into the carburetor venturi 8 through fuel passageway 7.

Within the carburetor venturi 8, air 53 is introduced in the carburetor simultaneously with the fuel. The air 53 is taken in through the air intake nozzle 9 of the air filter housing 12. Housing 12 has a top portion and a bottom portion 15 held together by pin 14 and nut 13. The air passes through the nozzle 9 to air filter 11; the air filter 11 removes any large particulates present in the air. The air 53 then travels through carburetor throat 10 where it is then available for mixing with the fuel in the carburetor venturi 8. The carburetor venturi 8 mixes the fuel-air combination 50. This mixture then travels into the engine intake 10 manifold 41 (see FIG. 5). The travel of the mixture is further disclosed in FIG. 5. As the fuel-air mixture travels through inlet manifold 48 to combustion chamber 47, or in an alternative embodiment the fuel air injectors, (not shown), the air components and activated fuel have a chance to react as the turbulence in the inlet manifold causes further mixing of the fuel-air combination. As the mixture enters the combustion chamber 47, the mixture spreads throughout the chamber.

In the preferred embodiment, as the mixture fills the available volume in the combustion chamber 47, it is ignited by a spark plug (not shown). In alternate embodiments, it is ignited by the pressure of the compressing piston 52, as is the case in diesel engines. Diesel fuel is ignited due to the heat caused by increased pressure, as opposed to a spark utilized in gasoline-powered engines.

It is at this point that the improved fuel becomes apparent. Upon ignition, caused by the spark plug, the fuel-air mixture becomes exothermic, i.e., it explodes. As the fuel-air reaction occurs, the piston is forced away from the explosion, down the length of the combustion chamber 47, which provides the mechanical force for the engine's workload.

The improved fuel-air mixture provides many more chain-branching radicals and ions than unimproved fuel. Chain-branching allows a more uniform combustion throughout the combustion chamber 47. In most engines, the fuel is not completely consumed in the combustion reaction. Often, this is the result of low-temperature combustion in the combustion chamber. Low temperature combustion results from not providing a means to pass the initial exothermic heat of combustion efficiently through the combustion chamber.

Fuel which undergoes the ionization combustion energizer process of the present invention, provides a mechanism by which more energetic reactants are dispersed throughout the combustion chamber, further reducing the likelihood of incomplete combustion.

The combustion reaction must be completed between the time the engine valve 54a opens to let the fuel-air mixture into the combustion chamber 47 and the time engine valve 54b opens to let the emissions of the combustion process out of the combustion chamber 47. Within that time interval, the fuel-air mixture is ignited and combusted.

The process of the present invention modifies the reactant fuel to allow the combustion process to near completion. Completion is defined as 100% combustion of all reactants, including combustible intermediate combustion products, such as carbon monoxide. Therefore, in a completed reaction, there will be zero hydrocarbons and zero carbon monoxide emitted.

An alternate embodiment of the present invention includes the addition of water in the combustion process. By adding water, the operating temperature of the engine would be further reduced. Water possesses two characteristics which make its presence in combustion both detrimental and beneficial. Water is detrimental due to its tendency to inhibit the oxidation of hydrogen. However, water actually increases the speed and exothermic reaction of the oxidation of carbon monoxide, as discussed in the prior paragraph.

The ionization combustion energizer 1 can also modify water as well as any other aqueous solutions introduced into the combustion process by ionizing the molecules in the solution. It is believed that the photoionization of water will dissociate more than enough water to overcome its inhibiting factor related to the oxidation of hydrogen. In an alternate embodiment of the ionization combustion energizer process, an ionization combustion energizer will be utilized to ionize any or all of the targets, such as fuels, oxidants and diluents introduced into the combustion chamber.

Figure 2:
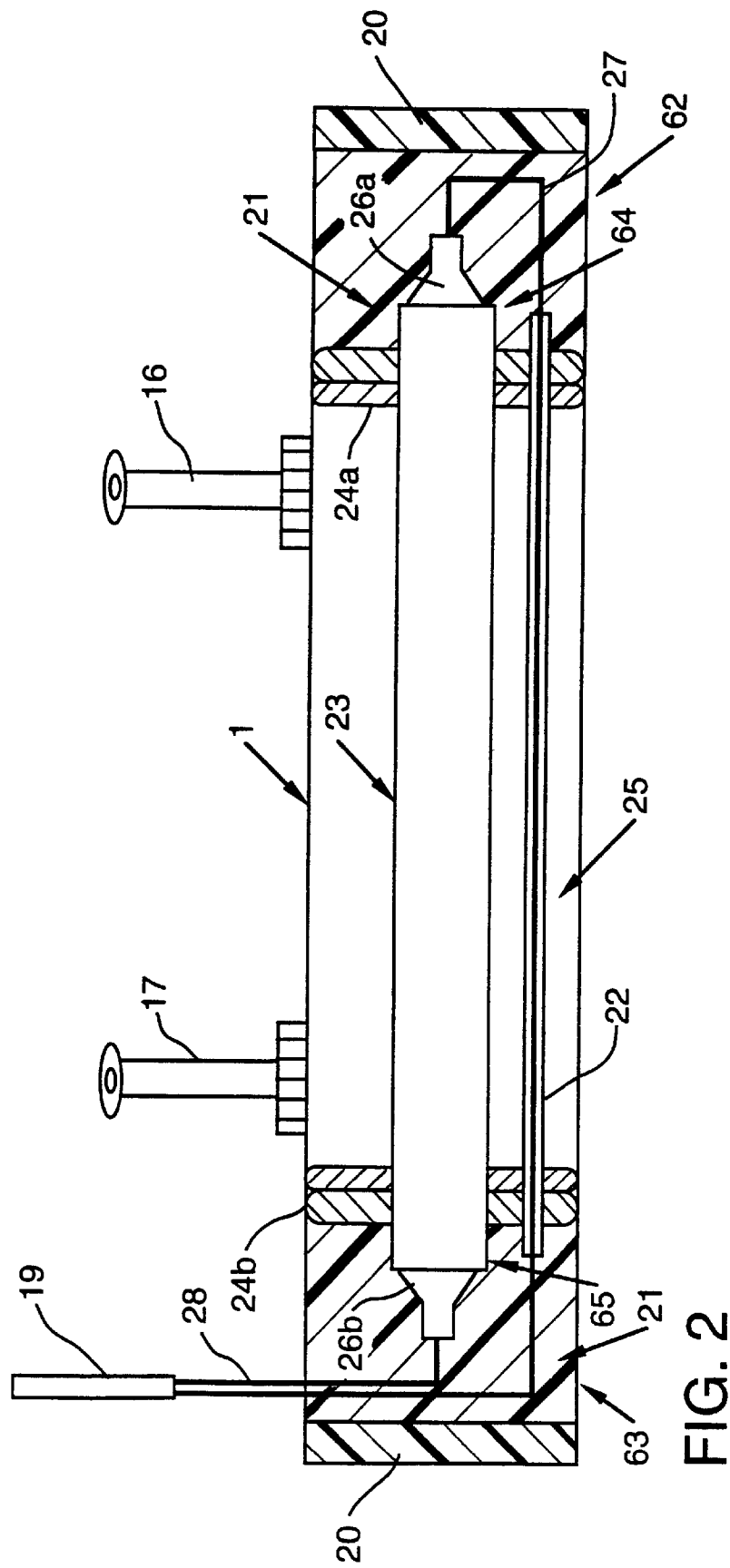
FIG. 2 is a static section view of the device of the present invention, the ionization combustion energizer.
Figure 3:
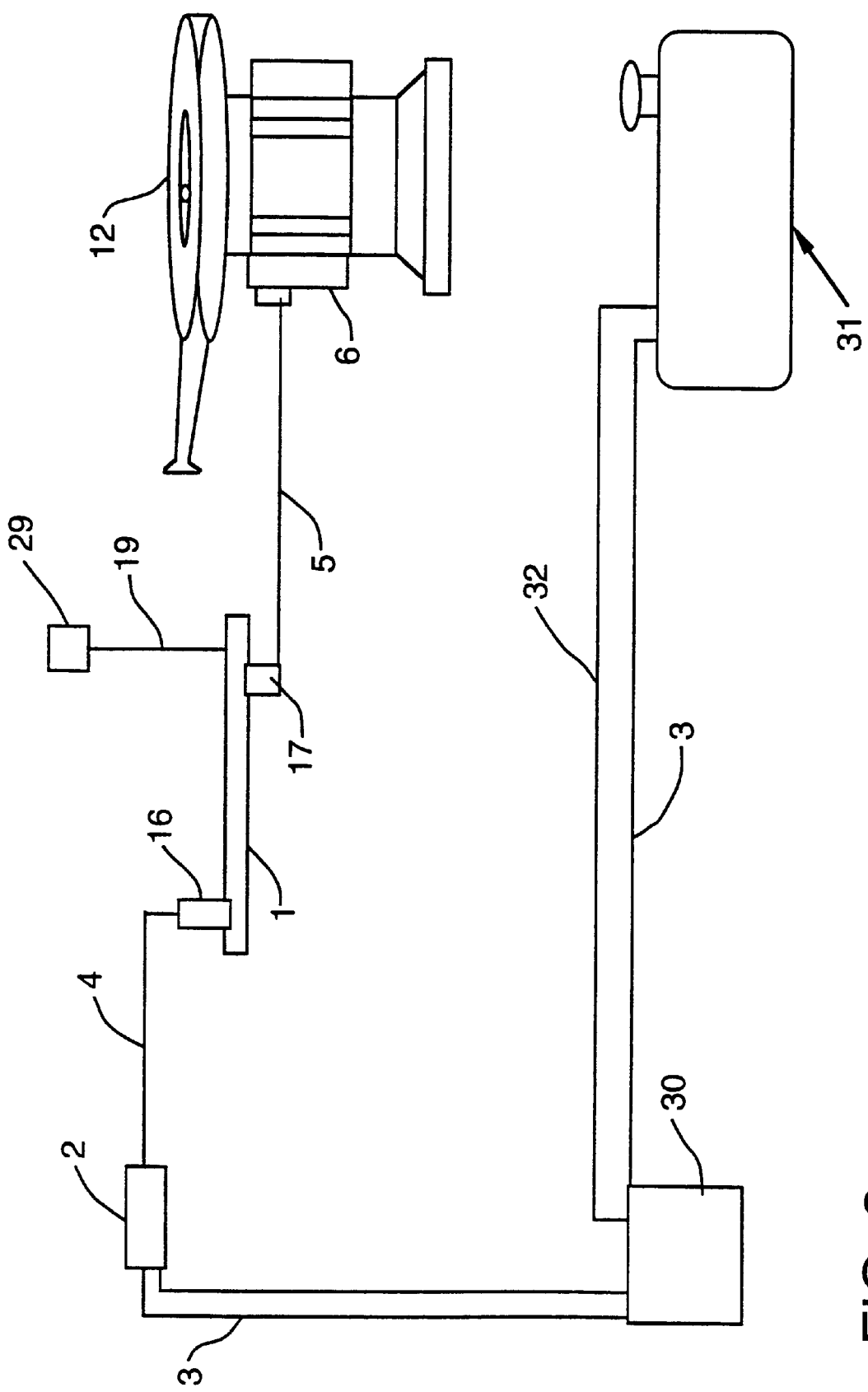
FIG. 3 is an exploded view of the components of the combustion engine of the present invention.

FIG. 2 is a section view of the ionization combustion energizer 1. The fuel is introduced into the ionization combustion energizer 1 via the preferred fuel transporter, inlet nipple 16. In the preferred target area, the reservoir 25, the fuel passes over the radiation generator 23, which in the preferred embodiment shown in this diagram is a non-pressurized ultraviolet element. Alternate embodiments of the radiation generator may include a laser operating in the vacuum ultraviolet frequency range, although in alternate embodiments lasers operating in lower frequencies will be effective, including those operating in the infrared wavelengths. The ionization combustion energizer may be reconfigured utilizing a radiation generator in the form of a block oscillator either at a set frequency or as a variable frequency oscillator.

The activation energy necessary to produce the ionization combustion energizer process is delivered by high-frequency photons. These photons can also be delivered by an electromagnetic wave generating device, like an oscillator or another alternative source commonly referred to as a laser. The laser/maser types of devices to be utilized in the ionization combustion energizer process are extremely efficient. The alternative embodiments of the radiation generators may prove to be more durable and longer lasting than the presently used ultraviolet lamps. Additionally, the alternative embodiments of the laser/maser types of devices may allow the effective distances to be increased due to their manner of transmission and will increase the efficiency of the device. A laser embodiment will allow a larger percentage of the incident photons to be absorbed due to the concentrated emission of these photons from the laser.

Almost all of the targets, such as fuel, oxidants and diluents, which come in contact with the photons delivered by these generators will be ionized or dissociated. However, there exists a known distance from the surface of the emitting device at which point the photons will no longer possess the necessary energy to dissociate or affect the target reactant. This distance is dependent upon the medium into which the photons are being emitted. Each medium will have a different but determinate solution.

In the preferred embodiment of FIG. 2, the radiation generator is suspended within the reservoir of the ionization combustion energizer between first seal 24a, proximate to first end 62 of the ionization combustion energizer and the inlet nipple; and second seal 24b, proximate to second end 63 of the ionization combustion energizer and the outlet nipple. It is preferred that the first seal and the second seal be constructed from polyurethane.

Figure 4A:
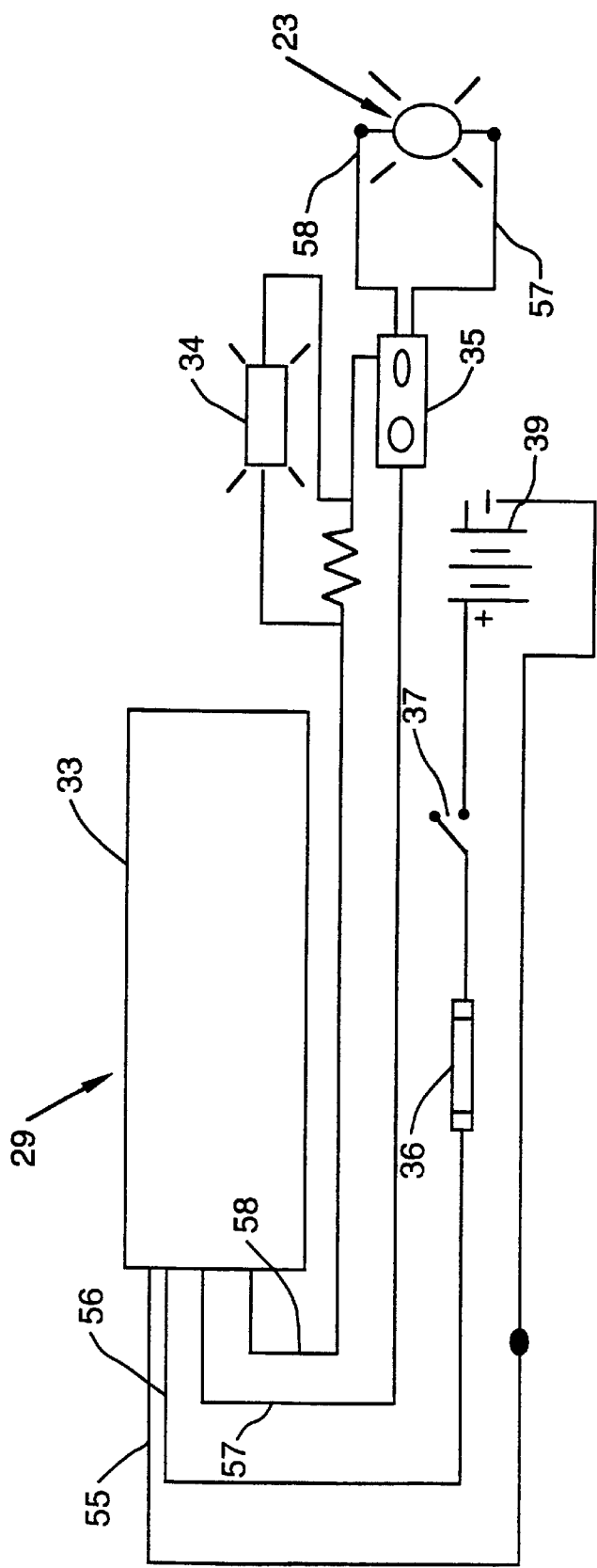
FIG. 4a is a circuit diagram showing the electronic circuit of the control box.

In the radiation generator of the preferred device, as shown in FIG. 2, there is a first lamp end 64 and a second lamp end 65, wherein the first lamp end is inserted into and secured by the first seal and the second lamp end is inserted into and secured by the second seal. Attached to the first lamp end 64 is a first end seal 26a and attached to the second lamp end 65 is a second skotch-kote seal 26b. In the preferred embodiment, the first wire 27 is attached to the radiation generator through the first end seal and the second wire 28 is attached to the radiation generator through the second end seal. It is preferred that all wires entering the ionization combustion energizer be shielded cable resistant to the fuel and oxidizing products formed through the ionization combustion energizer process. Steel tubing wire conduit 22 is the preferred manner of covering the first wire which runs through the ionization combustion energizer from first end to second end. The first wire and the second wire leave the ionization combustion energizer and the second end and proceed through wire conduit 19 and into control box 29 (see FIGS. 3 and 4a). As shown in FIG. 4a, the first and second wires within the conduit enter the control box at connection power plug 35.

The essential variable when determining the feasibility of an ultraviolet lamp is the wavelength generated. The preferred embodiment produces a wavelength of 253.7 nm. Regardless of the current necessary to operate the lamp, any competent electrical engineer will be able to design a control box and circuit capable of operating this lamp.

In the preferred embodiment, clear epoxy 21 is used to secure the radiation generator with first wire 27 and second wire 28. This is preferred due to its elasticity and durability. The first and second seals are preferred to have the same traits, and also be resistant to hydrocarbon-based fuels and to oxidation by the various products into which the fuel is broken down by the ionization combustion energizer. The fuel is retained within the reservoir of the ionization combustion energizer by first seal 24a and second seal 24b.

In an alternate embodiment of the ionization combustion energizer the preferred radiation generator may be secured to cap (not shown). The cap would attach to the ionization combustion energizer where the second seal is attached in FIG. 2 at the second end. This embodiment will allow replacement and maintenance of the lamp, when necessary. The first lamp end would then rest on a holder (not shown) attached to the first seal 24a at first end.

In another alternative embodiment, the radiation generator may remain suspended in the fuel at the first lamp end.

In the preferred embodiment, the ionization combustion energizer is made of aluminum due to the relative light weight, ease of construction and low cost of aluminum. The target area is most effective if coated or polished to become a reflective surface. A reflective surface will cause a higher percentage of the photons to react with the fuel molecules, rather than being absorbed by the reservoir. The ionization combustion energizer is preferably sealed with aluminum epoxy 20 or any other suitable sealant.

Figure 5:
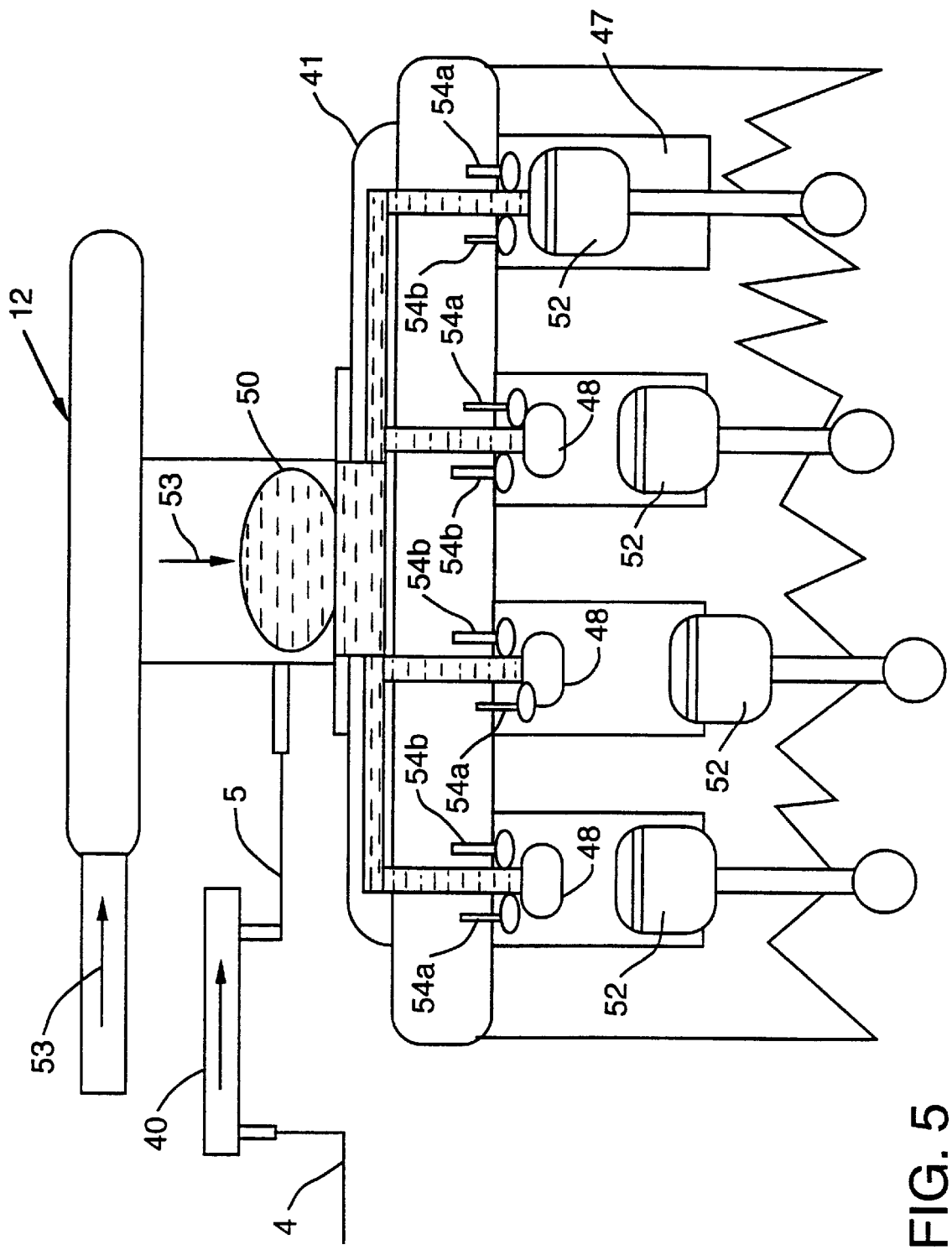
FIG. 5 is a static section view of the engine intake manifold.

In an alternative embodiment, the ionization combustion energizer can be placed just prior to the injectors, or in the intake manifold, just after the fuel and air mixes but before the mixture enters manifold inlet 48 (see FIG. 5 for the proximate location although the ionization combustion energizer is not depicted). This positioning of the radiation generator, closer to the carburetor venturi, is preferred for radiation generators in the laser embodiment. In this embodiment, the ionization combustion energizer would not have to possess a reservoir; rather, the target area would be comprised of a volume of the fuel line or the carburetor venturi. The ionization combustion energizer process would be directed into a reinforced and polished fuel line or fuel line nipple (not shown). With the ionization combustion energizer in the laser embodiment, the preferred placement of the ionization combustion energizer is at or near the point of most constricted flow of the fuel-air mixture. One or more lasers fixed at this point will optimize the ability of the ionization combustion energizer to operate at the optimal target area. This positioning is to facilitate the least loss of radicals and free ions due to recombination with other molecules. The ionization combustion energizer process will then affect the fuel-air mixture, not just the fuel alone. Because of the relatively short lifespan of the ionized/dissociated air (oxygen, nitrogen, $CO_2$ and other components of air), the radicals and the recombinations of these components prior to their combustion may prove to be even more effective than other alternative embodiments. The changes induced, for all practical purposes, can be considered instantaneous.

In yet another embodiment, a fiber optic cable may be added to the ionization combustion energizer. The fiber optic cable will allow a laser to transmit the necessary frequencies of photons to the target, without concern for the positioning of the laser. The fiber optic cable will carry the emitted frequency to the target as the target is moving through its ambient environment. In an internal combustion engine, as the hydrocarbon fuel passes through the fuel line, it will be repeatedly subject to laser emission, originating from the laser-fiber optic cable system. The fiber optic cable can also be utilized to convey the emitted frequency to one or more target areas, by only placing the emitting end of the fiber optic cable such that it will emit directly into the manifold inlet or other specified target area.

Regardless of the embodiment selected, the target which passes through the ionization combustion energizer undergoes numerous changes. Most if not all of the long chain hydrocarbon molecules that comprise the target are forced to decompose into simpler hydrocarbon molecules, which are easier to combust. Further, other products are formed which promote further decomposition. These products are called hydrocarbon radicals and radicals of oxygen, hydrogen and their combinations. Each of these products makes the combustion process more efficient by promoting combustion through a process referred to as chainbranching which causes more of these reactions to occur. These events make combustion more efficient by allowing the same amount of energy to burn more of the reactants within the same unit of time. This results in more engine output per fuel unit measure, and less non-combusted emissions such as carbon monoxide and THC's (unburned fuel). If combustion were complete, the only products would be water, carbon dioxide and non-combustible impurities such as molecular nitrogen and other components of air.

Any power supply source or energy storage device having the capacity to power the desired embodiment of the radiation generator can be utilized in the present invention, including but not limited to batteries, capacitors and bactacitors.

Figure 4B:
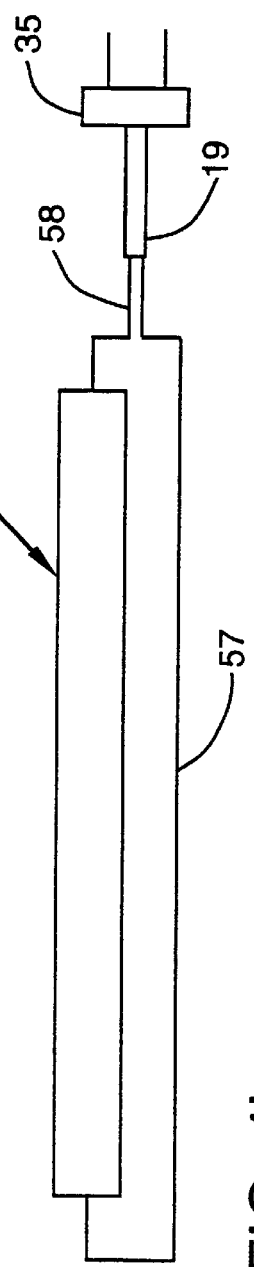
FIG. 4b is a diagram showing the circuitry of the UV lamp.
Figure 4C:
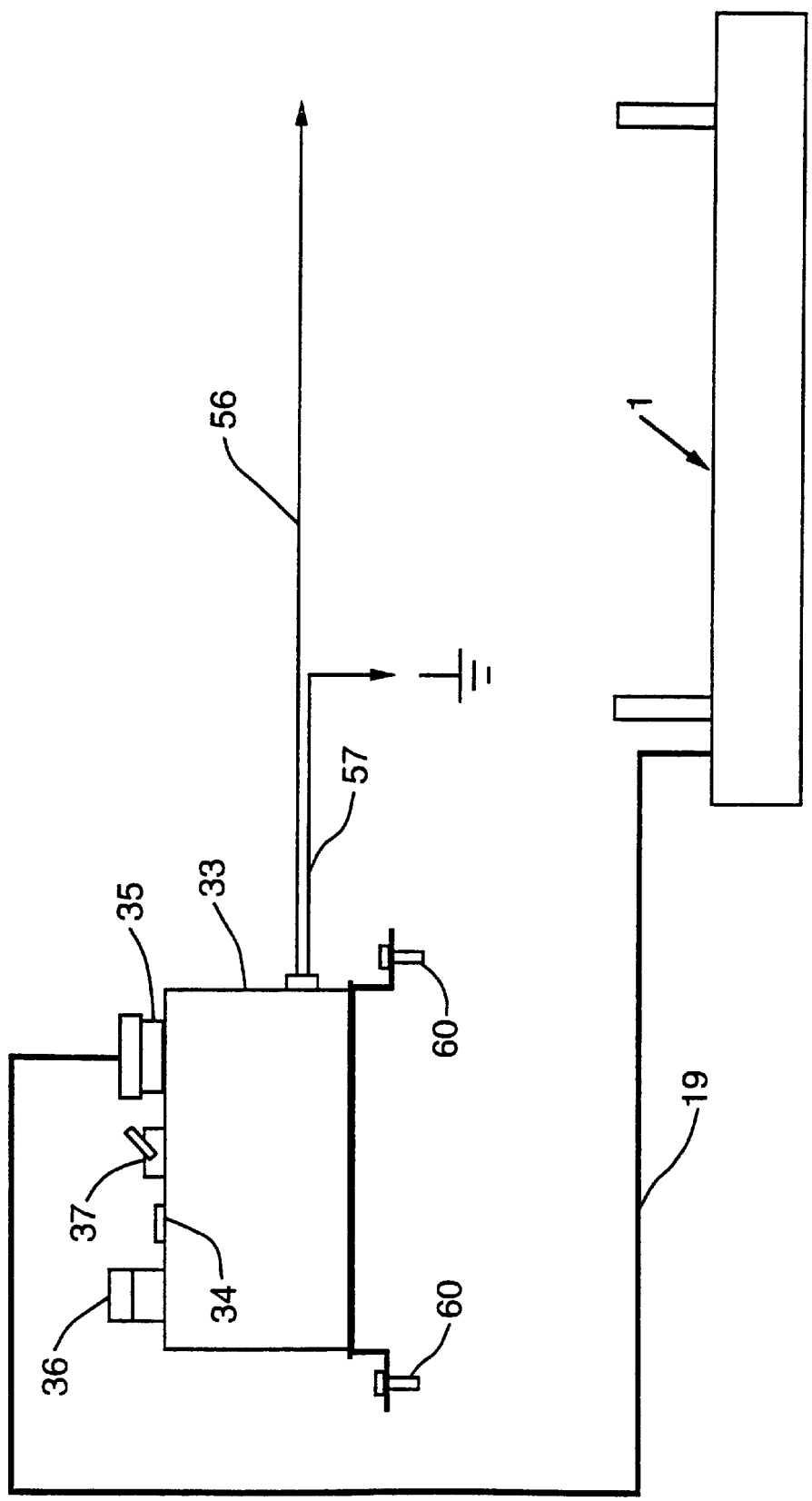
FIG. 4c is a diagram showing the circuitry between the ionization combustion energizer and control box.

In the preferred embodiment, the electronic circuitry powering the radiation generator is contained within control box 29 as depicted in FIGS. 4a, 4b and 4c. Preferably, power supply 39 which is necessary to operate the preferred embodiment of the ionization combustion energizer is a 12-volt battery. However, almost any power supply may be utilized in alternative embodiments of the control box. As depicted in FIG. 4a, the power supply connected to on/off switch 37, as shown in FIG. 4c, is located outside of the control box.

The power supply will only be connected in the preferred embodiment if the ignition switch for the engine (not shown) is in the "on" position (not shown). This prevents inadvertent use of the ionization combustion energizer, if the engine is not prepared to function and combust. In an automobile, this would mean that the ionization combustion energizer would not be functional if the car is not in use or if the key is not turned to the "ignition" position.

Fuse 36, which in the preferred embodiment is a single 5 amp fuse, is connected to switch 37 and control ballast 33, which is held in place by bolts 60. In alternative embodiments, these electronic components may be assembled in virtually unlimited combinations.

In the preferred embodiment, red wire 56 connects each of the electrical components, from the positive terminal of the power supply 39 to the switch 37, fuse 36 and control ballast 33. Line 55 is connected to the negative terminal of power supply 39. The control ballast 33 is used to step up the voltage from the 12 volts available from the power supply battery to the 350 volts necessary to operate the ionization combustion energizer. The control ballast is actually utilized to regulate the current. By reducing the current, the control ballast steps up the voltage. In alternative embodiments, other types of transformers may be utilized to replace the control ballast as a step-up device, current regulator and/or current rectifier.

The outgoing black wire 57 from the ballast to the electrical power plug connector 35 takes the current to the ionization combustion energizer.

In the preferred embodiment, LED indicator 34 is located on the outside of the control box to indicate power. Resistor 38 is utilized to reduce the current being fed through line 58 into the LED indicator (see FIGS. 4a and 4c).

While the foregoing discusses the preferred circuitry for the preferred radiation generator, any person with experience in electronics would be able to develop a circuit which will power the radiation generator.

The ionization combustion energizer may also be utilized in a number of non-internal combusting applications. Some of these include boilers, generating plants and cogenerators. In the cogenerating application as with each of the other non-internal combusting applications the ionization combustion energizer will be utilized to treat a target consisting of the fuel as well as the ambient air entering the combustion process. Cogenerators develop combustion from either a boiler or turbine unit. In a turbine system the ionization combustion energizer will be set up to operate on a target area immediately prior to the air intake manifold of the turbine, after this air has been heated to about 232° C. (450° F.). One of the difficulties of operating cogenerators is the need to maintain the air temperature being introduced into the cogenerator at about 232° C. (450° F.). To maintain and regulate this temperature, another ambient air stream is added to the heated air. The air stream being added is usually referred to as the secondary or tertiary air stream. An alternative target area is located prior to the introduction of this tertiary air stream into the primary air, which can be treated by an ionization combustion energizer. The ionization combustion energizer attached to the fuel line will provide the combustion process with ions and radicals related to the combustion products of hydrocarbons. In this embodiment, the fuel line is the preferred means for transporting the fuel to the target area.

These cogenerators are continuously firing. As the affected air mixes with the affected fuel, the combustion process develops a few key advantages. First, by treating all the air prior to its combination, we are maximizing the concentration of radicals and ions produced within the air being introduced into the combustion area. A typical cogenerator of 125 MegaWatts will utilize approximately 200 MCF per hour of Natural Gas. By treating the fuel as well as the air, we are providing a significant reduction in the amount of fuel utilized to combust the secondary fuel (often waste) or to develop the steam or electricity produced. Another advantage is the drop in the combustion temperature. Combustion temperatures produced within cogenerator's turbines or boilers must be maintained between about 927–955° C. (1700–1750° F.) and must never exceed 1010° C. (1850° F.). These temperatures are significant due to the stresses upon the metals utilized to hold the combustion systems and the necessity of combusting at a temperature which will provide an efficient combustion. By utilizing the ionization combustion energizer process, combustion will occur at reduced temperatures while increasing the efficiency of the combustion. Reducing the combustion temperature also reduces or eliminates the amount of oxides of nitrogen formed. By increasing the concentration of radicals and ions in the combustion process, most if not all of the oxides of sulfur ($SO_x$) will be combusted. This process will eliminate most of the hazardous emissions from this process.

Alternatively, in turbine-fired cogenerators, there is often an afterburner, which recombusts the particulates prior to their emittance into the primary stack. This afterburner adds air to the rising "superheated" products of the primary combustion. The temperature of this fuel is generally in excess of about 649° C. (1200° F.). Again, an ionization combustion energizer may be positioned so as to apply to the target area whereby the fuel is being introduced into the afterburner and/or to the ambient air.

By providing further ionization energizing, the emission levels will approach zero. A significant portion of the cost of any boiler, generator or cogenerator is attributable to "scrubbing technology". Scrubbers are one of the few viable means of treating hazardous airborne emissions from these combustion applications. With the use of the ionization combustion energizer, these combustion plants will spend fewer dollars on the cleanup of the airborne emissions while simultaneously saving money on the primary fuel, as well.

The ionization combustion energizer process of the present invention is equally applicable to internal and non-internal combustion engines regardless of the embodiment of the particular ionization combustion energizer and the selected target. Most fuels presently utilized are comprised of various "long chain hydrocarbon molecules", such as 2,2,4-trimethylpentane, commonly called "i-octane" ($CH_3C(CH_3)_2CH_2CH(CH_3)CH_3$). The resulting reaction is endothermic. In other words, the reaction takes energy from the system to complete the reaction. No heat or explosions are generated. This endothermic reaction is the result of the ionization combustion energizer of the invention. These fuels will travel from the entrance of the fuel reservoir (see FIG. 2), and as it passes through the reservoir, the fuel is affected by the ionization combustion energizer. If heat is added to the fuel at this juncture, the fuel would be susceptible to premature ignition or explosion. By generating light frequencies only, the energy is absorbed directly by the molecules within the fuel or oxidants. Energy not dissipated can cause a temperature increase which could result in an exothermic reaction. This can result due to energy being released into the ionization combustion energizer chamber at lower frequencies than those which will be absorbed by our reactants. Within nanoseconds, the fuel reacts. The reactions are all endothermic in the ionization combustion energizer process. The reaction takes energy from the system to complete the reaction so that no heat or explosions are produced. The basis for these reactions is movements of electrons in the fuel to higher energy states than occur at standard temperature and pressure (STP). Electrons can be found at a number of finite energy levels within an atom. Generally, these higher energy levels are transient, and the electron would normally react to fall to the "ground" level.

The process of adding energy to atoms and molecules through an electromagnetic process is called "photoexcitation", "photolysis" and "photoionization". Each of these terms and others may be used to describe the ionization combustion energizer process. As the photons collide with the atoms, most of the energy is passed to the electrons. However, this endothermic process will only happen at very high frequencies. The frequencies necessary in the current embodiment are no less than $7.5*10^{14}$ Hz. The necessary frequencies are directly related to the energy found within the photons emitted. As the photons travel, they lose energy. The point at which the photon no longer possesses the energy necessary to be absorbed by the impacting molecule is defined as the "effective distance".

In the embodiment utilizing a Laser/Maser source, the photons may be able to travel at slower frequencies, possibly as slow as 1*1011 Hz. At these frequencies, the interaction of a photon with a molecule or atom will result in ionization and/or dissociation. The need for high frequencies of photons is necessary to cause the hydrocarbon molecules to absorb the photons. However, in other aqueous solutions and nonaqueous mixtures, the necessary frequencies will be dependent upon the ionization potential, which is standard for each individual molecule and is measured in electron volts (ev), of the target to be affected. This can occur if the frequency multiplied by Planck's constant is equal to or greater than the ionization potential of the molecule. At frequencies larger than necessary for ionization, the molecules will continuously absorb any incident photons. Therefore, we may utilize electromagnetic radiation generators which emit photons at higher than necessary frequencies, without concern for the effectiveness of the ionization combustion energizer process.

If an atom or molecule undergoes ionization, the atom or molecule's electrons absorb energy, resulting in a higher energy level for the affected electron. When this transition occurs, the atoms and molecules affected frequently undergo more changes. In hydrocarbon-based fuels, the reactions are numerous. The hydrocarbon molecules begin to decompose, breaking down into other types of hydrocarbon molecules and hydrocarbon radicals. Radicals are unstable forms of hydrocarbons which are seeking more electrons or atoms to complete a transition to a more stable state. Other products of decomposition are radicals of oxygen, hydrogen, nitrogen and the radicals of their combinations. (O–) is an example of an oxygen radical, sometimes referred to as "activated" oxygen.

The description of the Ionization Combustion Energizing process has been described above from a macro view. The following will describe in some depth the micro view of the ionization combustion energizer process. To understand this process, it is important to realize that most combustion reactions involving hydrocarbon fuels will provide similar combustion products if the reaction is allowed to reach completion. All compounds, molecular fragments and ions produced as a result of combustion are referred to as products of combustion. The previous statement refers to the fact that regardless of the hydrocarbon fuel combusted, the combustion products are virtually the same in all reactions. Therefore, whether reference is made to the combustion of gasoline (i-octane), diesel (cetane) or any other fuel derived from hydrocarbons, the combustion products produced by these reactions will generally be the same.

The ionization combustion energizer process allows the combustion process to proceed at a faster rate by producing combustion products in greater concentrations which assist in speeding up the rate of the combustion reaction. As the fuel enters the ionization combustion energizer, each molecule in the fuel, whether a hydrocarbon (HC) molecule or a diluent, is subject to constant photon bombardment from the ionization combustion energizer generator. These photons are quantized bundles of electomagnetic radiation (energy), which in the current embodiment can be observed as ultraviolet light. The photon bombardment transfers energy from one source to another in an endothermic process.

The probability of an incident photon being absorbed by a molecule at a given wavelength is directly related to the transition moment. The transition moment is related to the absorptivity of the ground state species (electrons of the molecule) which may be calculated from experimentally measured intensities of incident and transmitted light by use of the Beer-Lambert Law:

$$A = \log(I_o/I) = \log(1/T) = a \; 1 \; c$$

where A is the absorbance, T is transmittance and Io and I are the incident and transmitted light intensities of a sample of concentration "c" with an optical path length of "1" and an intrinsic absorptivity "a". The absorptivity and the absorbance are both functions of the wavelength of the incident light. Absorbance is often referred to as optical density.

The incident photon must possess a frequency sufficient to have enough energy to be absorbed by the molecule. The simplest method to theoretically calculate this frequency is by the formula:

Energy=the Photon's frequency×Planck's constant.

If the energy is greater than the ionization potential of the molecule, the molecule will absorb the photon. By absorbing the photon, which possesses no mass, only energy, the molecule has added energy to itself. The level of energy of a photon in the ultraviolet range will fall between $2.2 \times 10^{-19}$ Joules to $6.6 \times 10^{-17}$ Joules of energy. When a molecule, atom or ion absorbs energy in the manner described, the incident is referred to as ionization. When the ionization is caused by an electromagnetically generated photon, the incident is referred to as photoionization.

If the ionization energy is unknown, the energy required can be determined by the following formula:

$$\Delta W = -RchZ^2[(1/(n_1)^2) - (1/n_2)^2]$$

where: R is the Rydberg constant (10,967,758 cycles/m)

c is the velocity of light ($2.998 \times 10^8$ m/s)

h is Planck's constant ($6.624 \times 10^{-34}$ joule-seconds)

Z is the atomic number of the atom to be targeted $n_1$ is the electron's ground state (n1=1) $n_2$ is the electron's first "excited" energy level ($n_2 = \infty$)

When $n_2$ approaches infinity, the electron can become free of the nucleus' force, holding it at its current ground state.

There are a number of variables which impact the preceding equations involving the absorption of the energy in an incident photon. First, the maximum distance a photon may travel while maintaining the necessary ionization energy must be addressed. This path length is variable due to the medium (the substance in which the target is traveling, i.e., Gasoline) and the turbulence in the medium, which affects the concentrations and densities found within the medium. The maximum path length can be determined by the following formula, which was arrived at by utilizing Maxwell's equations.

Maxwell's equations:

$$V \times E = -dB/dt \quad (1)$$

$$V \times H = J + dD/dt \quad (2)$$

$$V \times D = p \quad (3)$$

$$V \times B = 0 \quad (4)$$

E=electric field intensity t=time

H=magnetic field intensity p=charge density

D=dielectric displacement

B=magnetic induction

The above equations must be supplemented by the following material equations in order to allow a unique determination of the field vectors from a given distribution of current and charge.

$$J = \sigma E \quad (5)$$

$$D = \epsilon E \quad (6)$$

$$B = \mu H \quad (7)$$

where:

σ=specific conductance;

ε=electric inductance capacity; and

μ=magnetic inductance capacity.

$$k_e = \epsilon/\epsilon_o \text{ and } k_m = \mu/\mu_o.$$

$k_b$ is the specific electric inductance capacity (relative dielectric constant), and $k_m$ is the specific magnetic inductance capacity (relative magnetic permeability).

$$c = (\epsilon_0 \mu_0)^{-1/2}$$

$$P = D - \epsilon_0 E \quad (8)$$

$$M = (1/\mu_0)B - H \quad (9)$$

where:

P is the electric polarization;

M is the magnetic polarization.

The equations 6 and 7 represent the influence of matter upon the field and by the last two equations, 8 and 9. Specific boundary conditions will apply if the medium is not homogeneous (the mediums are not generally homogeneous).

Due to the effects of mediums upon wave propagation, the following equations must be utilized to describe the damped wave motion:

$$\nabla^2 E - (\sigma \mu dE/dt) - (\epsilon \mu d^2 E/dt^2) = 0$$

and $$\nabla^2 H - (\sigma \mu dH/dt) - (\epsilon \mu d^2 H/dt^2) = 0$$

Refractive Index:

$$\nabla^2 u - (\sigma \mu du/dt) - (\epsilon \mu d^2 u/dt^2) = 0$$

where u is the scalar quantity which may represent E or H.

If σ=0 then, $E_x = A e i(\omega t - kz)$. $E_x$ is the E component on the x axis. A is amplitude.

$$E_x = A \cos(\omega t - kz), \omega = 2\pi v$$

where: ω is the circular frequency v is the vibrational frequency and k is $$k^2 = \mu \epsilon \omega^2 - I \mu \sigma \omega$$

$$m = n(1 - ik)$$

where: m is the complex refractive index;

n is the real refractive index; and k is the index of absorption.

$I = I_0 \exp(-a'z)$ where: I is the intensity;

z is the path length from I to Io; and a' is the absorption coefficient.

$$a' = (4\pi n k)/\lambda o = 4\pi k/\lambda$$

intensity is directly proportional to $E_x^2$.

To solve for z:

$-(1/a') \ln (I/I_0) = z$

The reason for these variances of possible path length in a medium (homogeneous or nonhomogeneous) are due to the optical effect called scattering. Scattering effects will change due to the fluctuations of density, as well as concentrations, within the mediums.

The ionization combustion energizer and ionization combustion energizer process are a means to photoionize hydrocarbon molecules as well as that of other aqueous and nonaqueous solutions and mixtures. The ionization process is a result of absorption of energy of an incident photon by a molecule. The energy absorbed is transferred to the electron(s) of the molecule. This transference of energy to the electron is a result of the principle of conservation of momentum. Because the ion of the particular atom in question is many times more massive than the electron, the energy is passed to the electron. The energy given to the electron will initiate the chemical and physical changes in the hydrocarbon fuel. A gain or loss of energy by an electron in a molecular system may only occur when an electron undergoes a transition from its present orbital (energy level) to another with the energy difference between the two orbitals involved equal to the amount of energy gained or lost by the electron. Since the electron is a charged particle, it is able to interact with the electric and magnetic fields associated with a photon of electromagnetic radiation, thereby absorbing the energy of the photon and undergo a transition (quantum jump) to a higher molecular energy level. The amount of energy necessary for an electron to make an energy level change is a discrete quantity. The transition is instantaneous. If the photon does not possess enough energy, the molecule will hold that energy as vibrational energy. If another photon impacts, and the added energy is sufficient, recalling the prior energy transfer, the molecule will be photoionized. The ionized molecule can also be said to be excited. An excited state molecule, besides having more energy, may have a considerably different electron distribution and physical geometry than its unexcited counterpart. It is at this point that the excited molecule will undergo various photophysical and chemical changes and reactions.

It is also at this point of photon absorption that any microorganisms in the affected solutions will be destroyed. This embodiment is useful in Natural Gas and Oil field pumping production. It also may be used as a cleansing and sterilizing process for water and hydrocarbons production. The main concern in each of these applications is the need to eradicate $H_2S$ gas. The ionization combustion energizer process does this as a collateral function, due to its photoionization process.

Figure 6A:
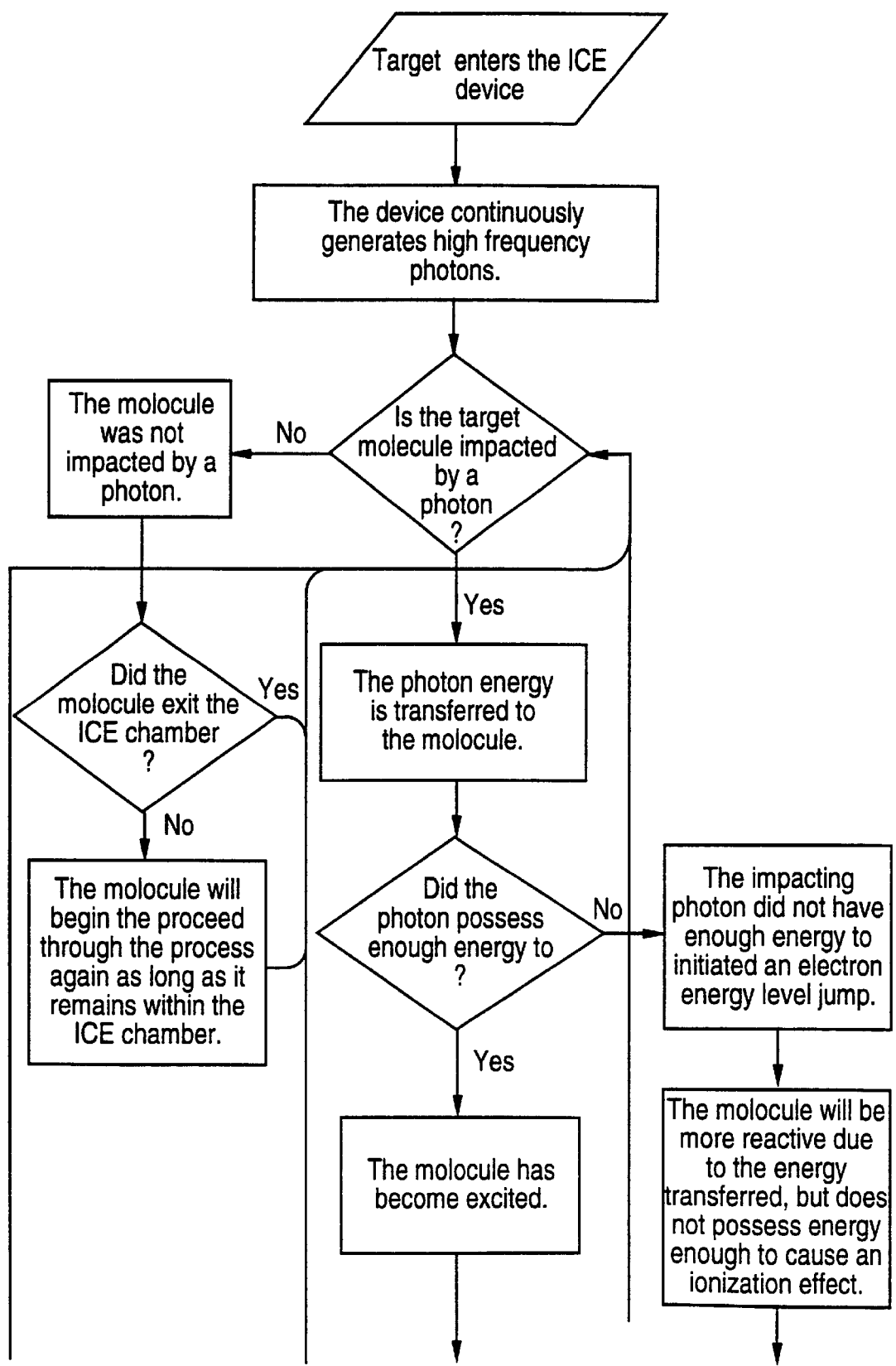
FIGS. 6A and B show a flowchart of the ionization combustion process.
Figure 6B:
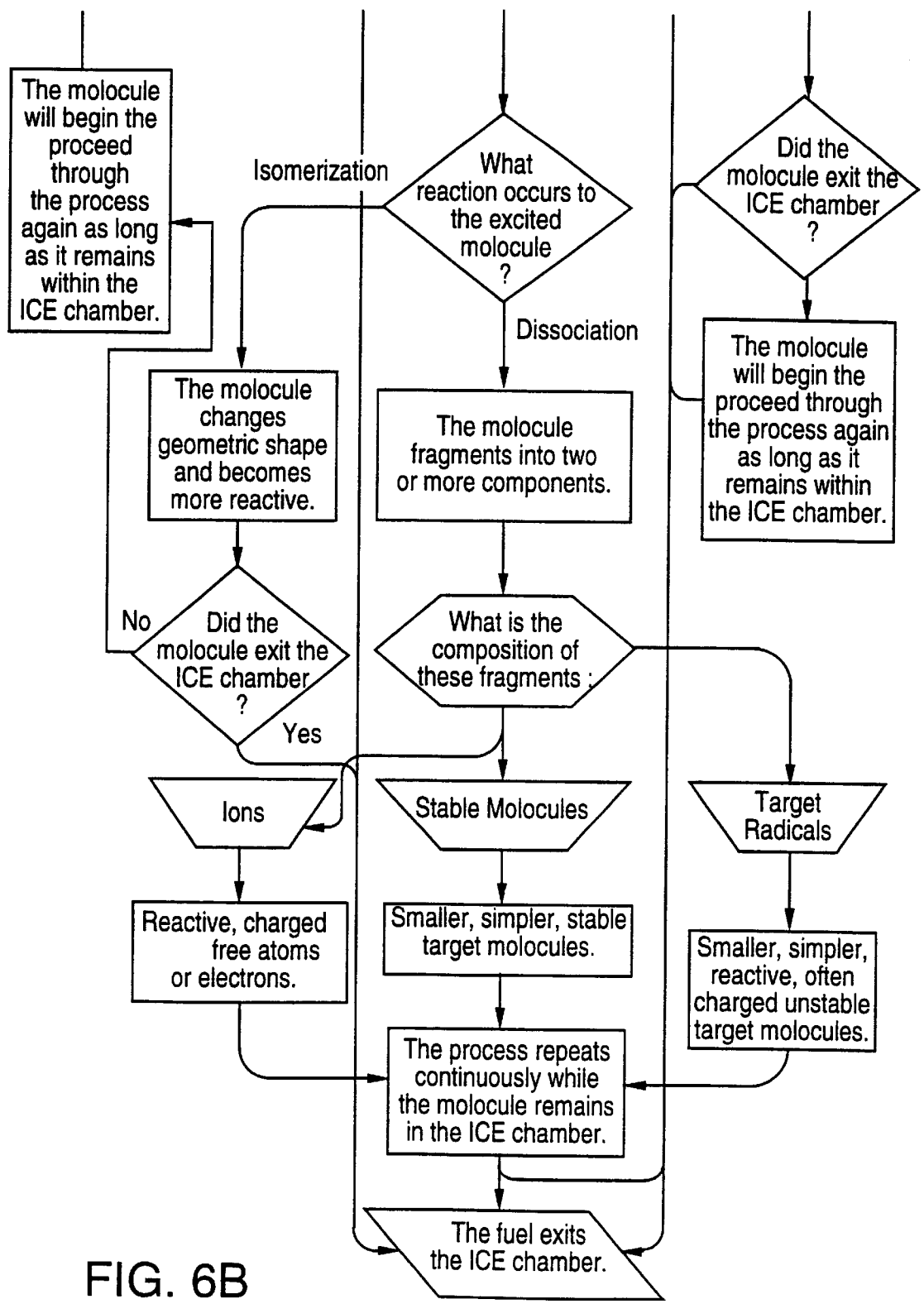

As the fuel enters the ionization combustion energizer chamber, the molecules are subject to a continuous barrage of photons generated by our ultraviolet radiation source. As the possible processes a molecule may undergo while in the ionization combustion energizer chamber are traced, reference is made to the Ionization Combustion Energizing Process Flow-chart shown in FIG. 6.

Due to the continuous generation of high frequency photons, each molecule is subject to this process repeatedly as it travels from the entrance of the ionization combustion energizer chamber to its exit, as long as the molecules travel within the effective distance (within the maximum path length) from the radiation generator. The chance of a molecule not being impacted repeatedly by incident photons is extremely small. As the molecule enters this photon barrage at each oscillation of the photon generator, the molecule is subject to being impacted by an incident photon. If no impact occurred, then at the next oscillation, a determination is made whether an impact occurred. If the molecule was subjected to a photon collision, the question is then whether the collision was efficient enough to have transferred all or some of its energy? If the photon transferred energy to the molecule, was it sufficient to initiate an energy level jump by the impacted molecule's electron(s)? A negative response means that the energy was not sufficient to initiate the transition, but has added energy to the molecule, which allows it to become more reactive, due to its increased entropy (energy).

However, if the photon transmitted energy sufficient for the quantum jump to be initiated, the molecule will undergo one of two possible changes, as it is now in an excited state. The molecule may simply change geometric shape and undergo a change in its electron distribution. This change also makes the molecule more reactive and less stable. This type of change in the molecule is referred to as Isomerization. An isomer is an atom or molecule with the same chemical makeup but a different geometric shape or change in electron distribution. The other type of change is called dissociation.

Dissociation is the process of separating two or more parts of a molecule by collision with a second body (which also occurs throughout the ionization combustion energizer process), or by the absorption of electromagnetic radiation, as is the case in the ionization combustion energizer process. The dissociation process may result in three different types of products: ions of a particular atom from within the original molecule, stable hydrocarbon molecules derived from the fragments of the original molecule and hydrocarbon radicals.

Ions are very reactive and will recombine with other products as they travel through the ionization combustion energizer and through the fuel system. Each ion can be impacted by incident photons while remaining in the ionization combustion energizer chamber. However, due to their rather small mass and volume, there is a significant chance of these fragments interacting with other molecules and fragments, as well as being impacted by other photons.

The next fragment to be examined is that of the stable hydrocarbon molecule. As mentioned above, most combustion products of hydrocarbons are the same. Typical stable products of dissociation of hydrocarbon molecules include alkenes and alkanes. These also are combustible and provide simpler fuels to combust. These products, too, are preferable to the initial long chain hydrocarbon fuel molecule, and, like all components of the fuel traveling through the ionization combustion energizer, will be subject to further ionization due to impacts of photons and other fragments.

Hydrocarbon radicals (HC) are generally the most beneficial for improved combustion. HC radicals are highly reactive, charged, unstable molecules of various hydrocarbon molecules. These products include alkyls, alkoxys and aldehydes, to name a few. These products have significant characteristics to assist the combustion process. The more of these products produced, the faster the combustion reaction. The speed of the combustion reaction is generally governed by the concentration of the various reactants. Radicals of hydrocarbons are also likely to react with other stable hydrocarbons to form simpler hydrocarbon molecules and more HC radicals.

Each of these three types of dissociation products as well as the isomers is subjected to the photoionization process repeatedly while in the ionization combustion energizer. These circumstances and events will repeat until the species exit the ionization combustion energizer chamber. All products are also subject to ionization due to collisions with other particles and fragments throughout the ionization combustion energizer process and its subsequent travel through the various fuel lines and mixing process in the carburetor's venturi.

In the optimal embodiment the ionization combustion energizer process and device would be as close as possible to the fuel-air mixture's introduction into the combustion chamber.

The optimal embodiment would be to focus one or more lasers at the entrance of the fuel-air mix to the injectors. This constricted passage would be highly reflective so that any photons which do not collide with a molecule may be reflected back into the fuel-air mix as opposed to being absorbed by the walls of the passage.

Once the fuel exits ionization combustion energizer it is no longer subject to photoionization. However, the effect of the ionization of the fuel will not be observed until the combustion reaction begins. Another observed trait of the ionization combustion energizer affected fuel is that, once it is photoionized, the fuel will not recombine to a similar initial state of the original hydrocarbon fuel, for a considerable length of time, if ever. Empirical evidence has been developed that the affected fuel kept in a closed system, such as a storage tank, can be kept up to 30 days without a significant loss in the effectiveness due to the ionization combustion energizer process. Thus, alternatively, the ionization combustion energizer process may be imposed prior to the dispensing of the fuel through commercial and retail outlets.

This is a significant event. Ionization combustion energizer modified fuel, if kept in a closed system, will remain activated for a currently unspecified length of time. A closed system refers to a system, such as a fuel tank, that has substantially no outside influences acting upon the system. There may be a possibility of modifying fuel through the ionization combustion energizer process and storing for a long length of time to be distributed to end-users at their convenience. The Wallis device described in U.S. Pat. No. 4,195,606, produced very short-lived radicals which reverted to ambient form under any duress, such as temperature or pressure changes. The ionization combustion energizer activated hydrocarbon-based fuel, however, is much more durable and longer lived.

As the ionization combustion energizer improved fuel travels through the carburetor, engine and fuel systems, the ions and radicals traveling through these systems will oxidize any reactive materials with which the fuel comes in contact. The result of this effect is that any carbon buildup, grease and dirt in the system, after continual exposure to the photoionized fuel, will be oxidized. This process has been observed to be 90% effective within 30 continuous hours of use, and almost 100% effective after 300 hours of use.

The carbon and other contaminants within these systems will react with the oxidizing agents in the fuel, the ions of hydrogen, oxygen and hydrocarbon radicals. The oxidizing agents and the reactants, carbon, grease and dirt will recombine with other fuel components including the oxidizing agents, eventually leaving no dirt, grease or carbon on any surfaces interacted with the fuel.

Prior to the fuel's departure from the ionization combustion energizer chamber and throughout its course to the combustion chamber, there are a number of reactions taking place. These are recombination reactions among different components of the fuel. These reactions are due to the unstable nature of the radicals, the availability of ions and the reactive nature of hydrocarbons in general. However, these reactions are induced by the movement of the fuel and subsequent mixing with the air in the venturi. These reactions will form more radicals and will break down any remaining larger hydrocarbon molecules. One reaction which is of particular interest is that of the recombination of methane ($CH_4$). $CH_4$ is often viewed as an inhibitor of combustion. This is due to the relatively long length of time for this molecule to be oxidized. Through the recombination process, and the earlier photoionization process, this species is greatly reduced in concentration. Additionally, the concentration increases in oxidizing factors available in the combustion chamber also adds to the reduction of inhibition due to $CH_4$ present during combustion.

The improved ionization combustion energizer affected fuel contains a significant concentration of hydrocarbon radicals, ions and simple hydrocarbon molecules as compared to the original long chain hydrocarbon fuel molecule, such as i-Octane, $CH_3C(CH_3)_2CH_2CH(CH_3)CH_3$. Molecules such as this take energy and oxidizing agents to break down the original molecular structure. Since ionization combustion energizer has eliminated the long chain molecules' concentration, the energy and oxidizing factors may be used towards the combustion of simpler hydrocarbon radicals. To understand the efficiency of the ionization combustion energizer process, the combustion process is described below.

In a generic combustion engine, the fuel is injected into the combustion chamber. Once the fuel-air mixture is injected, ignition is initiated by a spark plug (in diesel engines ignition is due to increased pressure upon the fuel). The fuel reacts with the oxygen in the fuel-air mixture and combusts. The exothermic reaction induced by ignition travels from the area of initial reaction to all parts of the combustion chamber, igniting the fuel-oxygen mixture as it spreads. The exothermic reaction is propagated by a combination of hot reactants, initiating a reaction in uncombusted reactants and other products of combustion, and spontaneous combustion due to a temperature and pressure increase throughout the combustion chamber. The first means of the propagation of ignition is that of the heat of the initial combustion, called Heat Conduction. The initial combustion of the hydrocarbon will produce stable, simpler hydrocarbons, such as alkanes and alkenes, which must also be combusted, as well as radical and ion production. However, as these products are produced, they disperse, carrying with them some of the heat of reaction, referred to as the diffusion of active intermediates, thus igniting other reactants. As this chain reaction spreads, each reaction carries less and less heat, eventually (microseconds later), some low temperature combustion occurs due to the lack of oxidizing agents, oxygen and radicals and heat. Low temperature combustion (<1200K) often results in slower combustion leaving some hydrocarbons and all the carbon monoxide in the immediate reaction area uncombusted and ready for emittance. Another problem occurring in combustion is that of chain-branching inhibition. Chain branching is the process of a propagation of a certain type of product such as radical production. All radicals will produce chain branching. Unfortunately, chain branching is inhibited by the combustion chamber walls. Another factor reducing the chain branching of the radicals is the use of radicals as initial oxidizing agents, thus removing them from more chain branching, generating even more radicals. Usually in the oxidation process, the radical can only replace itself without generating other radicals. Radical production is also significant due to its low activation energy (often approaching zero) which allows it to combust even at low temperatures. Therefore, hydrocarbon oxidation will complete even at low temperatures if radicals are available to react. The ionization combustion energizer significantly increases the concentration of radicals available in the combustion chamber. Increased availability of radicals in combustion allows the reaction to approach completion by combusting any and most remaining hydrocarbons. The remaining radicals will also be combusted by oxygen and other radicals. In the optimal performance of ionization combustion energizer, there will be no long chain hydrocarbons introduced in the combustion chamber, as a result of the dissociation process initiated by the ionization combustion energizer apparatus.

The emissions generated via the combustion reaction of hydrocarbon-based fuels, affected by the ionization combustion energizer, will have far fewer emissions of unburned hydrocarbons, which are also referred to as THC's (approaching zero parts per million), carbon monoxide and oxides of nitrogen. The primary airborne emissions will be water, diluents and carbon dioxide.

The ionization combustion energizer process will allow all combustion engines to perform more efficiently. This process will allow more engine output while decreasing the amount of toxic emissions generated.

We claim:

1. A device for use in a combustion engine, comprising:
   a radiation generator for generating and emitting radiation with a frequency in the range of not less than about $1 \times 10^{11}$ Hz;
   means for directing said radiation to a target area along a fuel line at a position spaced from a combustion chamber of the engine;
   a power supply for the operation of the radiation generator connected thereto; and
   a fuel transporter fluidly connected to the target area to deliver fuel in passage from the fuel tank along the fuel line to the target area and, following radiation, to deliver fuel from the target area along a further length of fuel line to the combustion engine.

2. The device of claim 1, wherein the target area is positioned within a reservoir fluidly connected to the upstream end of the fuel line by means of an inlet and to the downstreamd end of the fuel line by an outlet.

3. The device of claim 2, wherein the radiation generator is suspended within the reservoir between a first seal adjacent to the inlet to the reservoir and a second seal approximate to the outlet of the reservoir.

4. The device of 3, wherein the radiator generator has a first end and a second end, with the first end being inserted into and secured by the first seal and the second end being inserted into and secured by the second seal, there being a first wire attached to the radiation generator through the first end seal and a second wire attached to the radiation generator through the second end seal, the wires being connected to the power supply.

5. The device of claim 4 wherein a steel tubing wire conduit covers part of the first wire which runs through the radiation generator from the first end to the second end.

6. The device of claim 1 wherein the target area is positioned within a volume of the fuel line.

7. The device of claim 1, further comprising an air intake immediately preceding the target area to permit irradiation of a fuel air mixture.

8. The device of claim 1, wherein said means for directing said radiation to the target area is a fiber optic cable.

9. A device for use in a combustion engine comprising;

a radiation generator emitting radiation with a frequency in the range of not less than about $1 \times 10^{11}$ Hz;

a fiber optic cable adapted to direct the radiation from the radiation generator to a target area, the target area being positioned at a location remote from a combustion chamber of the engine;

a power supply for the operation of the radiation generator connected thereto; and a fuel transporter fluidly connected to the target area to transport fuel in passage to the engine, to the target area for irradiation, and from the target area to a fuel line for further passage to the combustion chamber.

10. A combustion engine comprising:

a combustion chamber;

air intake means fluidly connected to the combustion chamber;

a fuel tank upstream of the combustion chamber;

a fuel line fluidly connecting the fuel tank to the combustion chamber;

a radiation generator for generating and emitting radiation with a frequency in the range of not less than about $1 \times 10^{11}$ Hz;

means for directing said radiation to a target area along a fuel line at a position spaced from the combustion chamber;

a power supply for the operation of said radiation generator connected thereto; and a fuel transporter fluidly connected to the target area to deliver fuel in passage from the fuel tank along the fuel line to the target area and, following radiation, to deliver fuel from the target area along a further length of the fuel line to the combustion chamber.

* * * * *

UNITED STATES PATENT AND TRADEMARK OFFICE
CERTIFICATE OF CORRECTION

PATENT NO.    : 6,474,315 B1
DATED         : November 5, 2002
INVENTOR(S)   : Sadkin et al.

It is certified that error appears in the above-identified patent and that said Letters Patent is hereby corrected as shown below:

<u>Title page,</u>
Item [57], ABSTRACT,
Line 11, delete "wavelength" and insert -- frequency -- therefor.
Line 12, delete "1x 1011" and insert -- 1x $10^{11}$ -- therefor.

<u>Column 6,</u>
Line 19, after "reservoir" insert -- 25 -- therein.

<u>Column 13,</u>
Line 3, delete "1* 1011" and insert -- 1x $10^{11}$ -- therefor.

Signed and Sealed this

Eighth Day of April, 2003

JAMES E. ROGAN
*Director of the United States Patent and Trademark Office*